United States Patent Office 2,983,729
Patented May 9, 1961

2,983,729
PREPARATION OF 5-HALOTHIENYL AMINES

Ferdinand C. Meyer, Kettering, Ohio, and Henry C. Godt, Jr., St. Louis, Mo., assignors to Monsanto Chemical Company, St. Louis, Mo., a corporation of Delaware No Drawing. Filed Apr. 30, 1958, Ser. No. 731,891

19 Claims. (Cl. 260—294.8)

This invention relates to the preparation of 5-halo-2-thienyl amines. More specifically it relates to the halogenation of amines containing a thienyl group.

Amines and salts of amines containing the 5-halo-2-thienyl group are known useful compounds. For example, 5-chloro-2-thienyl amines and 5-bromo-2-thienyl amines and their salts have antihistaminic properties. Usually compounds containing the 5-halo-2-thienyl group are prepared by using a 5-halo-2-halomethylthiophene as a reactant, see for example U.S. 2,498,227. In the preparation of 5-chloro-2-thienyl amines and 5-bromo-2-thienyl amines, it has been suggested in U.S. 2,604,473, for example, that these halothienyl amines be prepared using 5-chloro-2-halomethylthiophene or 5-bromo-2-halomethylthiophene as reactants and then chlorinating or brominating the resulting amine with chlorine or bromine to form a compound containing the chlorothienyl or bromothienyl groups. However, such a process employing molecular chlorine or bromine produces low, nonreproducible yields of the desired 5-halothienyl amine since chlorine and bromine react with these thienyl amines both by substitution and by addition. Also the use of molecular chlorine or bromine forms in addition to the 5-chloro-2-thienyl amine or 5-bromo-2-thienyl amine, position chloro- and bromo-isomers which can only be separated with difficulty, if at all, from the desired 5-chloro-2-thienyl amine and 5-bromo-2-thienylamine respectively. Although the desired 5-chloro-2-thienyl or 5-bromo-2-thienyl compounds are said to be produced by such a process they are either obtained in exceedingly low yields where capable of isolation from the direct halogenation mixture or, whatever yields are obtained, are of no practical use since the desired compound cannot be economically recovered from the reaction medium containing the position isomers.

It is an object of this invention to provide an improved process for the preparation of 5-halo-2-thienyl amines. It is a particular object of this invention to provide an improved process for the preparation of 5-chloro-2-thienyl amines and 5-bromo-2-thienyl amines which are useful as anti-histamines. Further objects will become apparent from the description of the novel process of this invention.

It has now been discovered that amines containing the 5-halo-2-thienyl group:

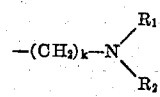

wherein X is a halogen atom preferably chlorine and bromine and $R_1$ and $R_2$ are hydrogen or lower alkyl groups, i.e. they contain from 1 to 4 carbon atoms; can be readily prepared by halogenating with at least an equimolecular proportion of a sulfuryl halide, an amine containing the thienyl group including the unsubstituted thienyl group ($R_1$ and $R_2$ are hydrogen) as well as thienyl groups substituted in the 3 and 4 position ($R_1$ and/or $R_2$ are lower alkyl groups) in an inert liquid reaction medium provided by a non-aqueous inert solvent or dispersing medium for the thienyl amine or acid salt of the amine.

The term "amines containing the 5-halo-2-thienyl group" used herein shall be understood to refer to organic compounds in which the free valence of the 5-halo-2-thienyl group is attached to an inert amine residue, i.e. inert in the sense that the amine residue portion of the molecule will not readily halogenate either by substitution or addition.

Amines containing the 5-halo-2-thienyl group and which have the following structure are illustrative of the amines which can be produced by the improved method of this invention:

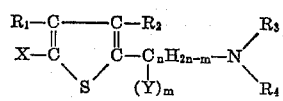

wherein X is a halogen atom; Y is selected for the group consisting of aryl hydrocarbon radicals having from 6 to 12 carbon atoms and a six-membered hetero cyclic nitrogen containing radical; $n$ is an integer of from 0 to 6; $m$ is an integer of from 0 to 1; $R_1$ and $R_2$ are selected from the group consisting of hydrogen and lower alkyl radicals, e.g. methyl, ethyl, n-propyl, isopropyl, isobutyl, n-butyl, etc.; $R_3$ is selected from the group consisting of (a) hydrogen, (b) an alkyl radical having up to eighteen (18) carbon atoms, e.g. methyl, ethyl, n-propyl, heptyl, 2-ethylhexyl, isodecyl, n-decyl, dodecyl, cetyl, etc., (c) an aryl radical having from six (6) to twelve (12) carbon atoms, e.g. phenyl, beta-naphthyl, alpha-naphthyl, xylyl, tolyl, 4-ethylphenyl, 2,3,6-trimethylphenyl, benzyl, phenylethyl, phenyl-propyl, 2,4-dimethylphenylpropyl, etc., (d) a cycloalkyl radical having from four (4) to ten (10) carbon atoms, e.g. cyclobutyl, cyclopentyl, cyclohexyl, cycloheptyl, cyclooctyl, cyclodecyl, 4-methylcyclohexyl, 2,4-dimethylcyclohexyl, cyclohexylmethyl, cyclohexylbutyl, etc., (e) a six membered heterocyclic nitrogen containing radical, e.g. pyridyl, piperidyl, picolinyl, 2,4-dimethylpyridyl, 5-ethylpiperidyl, etc.; and $R_4$ is selected from the group consisting of $R_3$ and a radical of the structure:

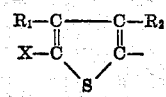

wherein $k$ is an integer of from one (1) to six (6) and $R_1$ and $R_2$ have the same meaning as above.

While it is possible to convert the free amine to its acid salt through use of the sulfuryl halide reactant, it is obviously more economical to use another salt forming agent to effect such a result before attempting to halogenate the 2-thienyl group. Hence the most efficient use of the sulfuryl halide is achieved by carrying out the reaction using the acid salt of the thienyl amine rather than the free base.

Certain amine acid salts, e.g. salts with inert organic acid such as trimethyl acetic acid, benzoic acid, tetramethyl succinic acid and the like, which acids are well known to those skilled in the art as being inert with respect to sulfuryl halide, may be used in forming the 5-halo-2-thienyl derivatives. However, it is preferred to use as the reactants in the process of this invention such acid salts as the hydrohalides of the thienyl amines, since other inorganic acids form acid salts with the thienyl containing amine which complicate the recovery and/or purfiication and conversion of the amine acid salts to the organic acid salts (i.e. desired pharmaceutical form). The hydrochlorides are especially preferred and particularly so where sulfuryl chloride is used as the sulfuryl halide reactant. In the case of the hydrohalide acid salts it is possible to start with the free base in the inert liquid reaction medium, convert the free base to its acid salt and without separating or purifying the salt or its solution or suspension to proceed directly with the halogenation step.

The following specific examples are intended to illustrate the process of this invention and are not intended as a limitation thereon. In these examples the term "parts" is employed to indicate parts by weight.

EXAMPLE I

*2-[(5-chloro-2-thenyl)(2-dimethylaminoethyl)amino]pyridine*

To a cooled suspension of 208.5 parts of 2-[(2-dimethylaminoethyl)-(2-thenyl)amino] pyridine hydrochloride (Methapyrilene Hydrochloride) and 600 parts of chloroform, there is added 60 parts of dry HCl. The resulting solution is cooled to approximately 5° C. and there is added, dropwise and with stirring, 97.3 parts of sulfuryl chloride while maintaining the temperature at 5° C. After all the sulfuryl chloride is added, the resulting solution is stirred for about one and a half hours. The solution is degassed under vacuum (130 mm. Hg) for one hour. The degassed solution is made distinctly basic (pH above 10) with 480 parts of an aqueous solution containing 120 parts of sodium hydroxide. The resulting mixture is permitted to settle and the aqueous phase is removed and discarded. The remaining chloroform phase is washed with water and the chloroform is removed by distillation. The residue in the still pot is a free base identified as 2-[(5-chloro-2-thenyl)(2-dimethylaminoethyl)amino] pyridine which has a boiling point of 162–166° C. at 0.75 mm. Hg and an index of refraction $n_D^{25}$ of 1.5860. The yield obtained is 83% of the theoretical.

The purity of the free base obtained above is tested by dissolving 29.6 parts of the free base and 19.2 parts of citric acid in 158 parts of acetone (95%). The mixture is refluxed for 15 minutes and then cooled slowly. The product crystallizes out, after seeding, at 38–40° C. The mixture is cooled to 0° C., filtered and washed with 30 parts of cold acetone (95%). There is obtained 43.5 parts of a clear product having a melting point of 114–116° C.

In contrast to this, the process of the prior art, i.e. Example XI of U.S. 2,604,473 or Example XI of U.S. 2,656,356, in which molecular chlorine is used as the chlorinating agent, produces the desired 5-chloro-2-thienyl amine compound in low, non-reproducible yields, because of the production of substantial amounts of position isomers and addition products and the added difficulty in separating the desired 5-chloro-2-thienyl amine.

The results obtained in the procedure which follows are representative of the results obtained when operating according to the method disclosed by Sperber in the aforesaid patents.

To a cooled solution (10° C.) of 59.6 parts of methapyrilene hydrochloride and 150 parts of acetic acid, there is added slowly and continuously 20.0 parts of Cl₂ gas with stirring. The mixture is stirred for 30 minutes after all the gas is in and then degassed under vacuum for 30 minutes. 150 parts of water are added and the solution is neutralized and made basic (pH above 10) with 180 parts of NH₄OH (28%) and 20 parts of NaOH in 100 parts of water. The resulting solution is extracted with chloroform, washed with water and then distilled to remove the chloroform. The residue, 28.6 parts (yield 48%) has a boiling range of 182–200° C. at 2.4 mm. Hg and an index of refraction $n_D^{25}$ of 1.5862. Decomposition of the reaction product occurs throughout the distillation.

The purity of this material is tested by dissolving 11.5 parts of the residue in 61 parts of acetone which contains 7.5 parts of citric acid. The mixture is refluxed for fifteen minutes and then cooled slowly to 0° C. in one hour. The product is filtered and washed with 30 parts of cold acetone (95%). There is obtained 11.3 parts of a product having a melting point of 105–117° C.

It is evident from a comparison of the results obtained in the above two experiments, that the process of this invention, illustrated in column 3, lines 14–35 is far superior to the process of the prior art, illustrated in column 3, lines 44–70 where one is seeking to obtain a 5-halo-2-thienyl amine from the corresponding amine.

EXAMPLE II

*2[(5-chloro-2-thenyl)(2-dimethylaminoethyl)amino]pyridine*

To a solution of 52.3 parts of Methapyrilene and 148 parts of chloroform, there is added 21.9 parts of dry hydrogen chloride. The resulting solution of Methapyrilene trihydrochloride is warmed to 35° C. To this warmed solution there is added 28 parts of sulfuryl chloride dropwise with stirring and the reaction temperature is maintained at 35° C. Upon completion of the addition of the sulfuryl chloride, the reaction mixture is stirred for one hour at 35° C. The solution is then degassed at a reduced pressure of 100–150 mm. Hg for 1 hour. The degassed solution is then cooled, neutralized with 240 parts of an aqueous solution containing 24 parts of sodium hydroxide with stirring. The resulting mixture is permitted to settle and the aqueous phase is removed and discarded. The remaining chloroform phase is washed with water and thereafter the chloroform is removed by distillation. There remains behind in the distillation equipment a good yield of free base identified as 2-[(5-chloro-2-thenyl)(2-dimethylaminoethyl)amino] pyridine having a boiling point at 0.9 mm. Hg of 162–165° C. and an index of refraction of 1.5860.

EXAMPLE III

*N-butyl-5-chloro-2-thenylamine*

To a cooled solution (0–5° C.) of 84.7 parts of N-butyl-2-thenylamine and 400 parts of chloroform, there is added 20.1 parts of dry HCl. To this cool solution of the amine hydrochloride there is added 74.3 parts of sulfuryl chloride dropwise with stirring and the reaction temperature is maintained at 0–5° C. The reaction mixture is then stirred for 2½ hours at 0–10° C. The solution is degassed at 20–25° C. under vacuum and then neutralized and made basic with 104 parts of 50% NaOH, keeping the temperature below 50° C. 150 parts of water are added and the solution is held at 50° C. for one hour. The solution is then cooled to room temperature and the organic phase is separated. The chloroform is removed by distillation. The residue remaining in the flask is distilled, and a fraction is obtained which is identified as N-butyl-5-chloro-2-thenylamine and has a boiling point at 8.4 mm. Hg of 129–132° C. and an index of refraction $n_D^{25}$ of 1.5232. The yield obtained is approximately 50% of the theoretical.

EXAMPLE IV

*5-chloro-N-cyclohexyl-2-thenylamine*

5-chloro-N-cyclohexyl-2-thenylamine is prepared by reacting 82 parts (0.35 moles) of N-cyclohexyl-2-thenylamine hydrochloride with 54.6 parts of sulfuryl chloride in 400 parts of chloroform according to the procedure of Example III with the following alterations: (1) The reaction mixture is stirred overnight at room temperature and (2) the neutralized solution is heated for one hour at 50° C. and stirred overnight at room temperature. 36.2 parts of a free base identified as 5-chloro-N-cyclohexyl-2-thenylamine is obtained, which has a boiling point of 124–127° C. at 1.6 mm. of Hg and an index of refraction $n_D^{25}$ of 1.5479. The yield obtained is 45% of the theoretical.

The procedure of the present example is repeated, except that an equimolecular amount of N,N-dicyclohexyl-2-thenylamine is substituted for the N-cyclohexyl-2-thenylamine. A good yield of a product identified as 5-chloro-N,N-dicyclohexyl-2-thenylamine is obtained.

EXAMPLE V

5-chloro-N,N-diethyl-2-thenylamine 5-chloro-N,N-diethyl-2-thenylamine is prepared by reacting 90.3 parts of N,N-diethyl-2-thenylamine with 64.8 parts of sulfuryl chloride according to the procedure of Example IV. There is obtained 72.3 parts of a colorless liquid which has a boiling point of 105–108° C. at 10.4 mm. Hg and an index of refraction $n_D^{25}$ of 1.5190. The yield obtained is 80.7% of the theoretical.

The procedure of the present example is repeated except that: 790 parts of n-hexane is substituted for the chloroform of said example (this provides a suspension of the amine hydrochloride instead of a solution of same), the reaction mixture is stirred for two and one-half hours, and after the addition of 96 parts of 50% lye, the mixture is stirred for one hour at 50° C. There is obtained a good yield of a product identified as 5-chloro-N,N-diethyl-2-thenylamine which has a boiling point of 95–100° C. at 5.8 mm. Hg and an index of refraction $n_D^{25}$ of 1.5189.

EXAMPLE VI

2(5-chloro-2-thenylamino)pyridine

To a solution of 95.1 parts of 2-thenylaminopyridine and 450 parts of chloroform, there is added 40.1 parts of dry HCl while maintaining the temperature at 5–10° C. To the resulting dihydrochloride there is added, dropwise with stirring, 70.2 parts of sulfuryl chloride and the reaction temperature is maintained at 0–5° C. The solution is stirred for one hour and then degassed under vacuum. The degassed solution is made basic (pH above 10) by adding 86 parts of NaOH in 100 parts of water and 200 additional parts of water are added to dissolve the sodium chloride formed. The organic layer is separated and thereafter distilled to remove the chloroform. On fractionating the residue there is obtained 88.8 parts of a product having a boiling point of 185–220° C. at 2.9 mm. Hg. On refractionating this material there is obtained 59.9 parts of a product identified as 2(5-chloro-2-thenyl-amino)pyridine which has a boiling point of 163–168° C. at 1.9 mm. Hg. The product solidifies and on recrystallization from acetone melts at 87–90° C. The yield obtained is 53.3% of the theoretical.

The procedure of Example VI is repeated except that equimolecular amounts of (1) the di-hydrobromide of 2-thenylaminopyridine is substituted for the dihydrochloride of said example and (2) sulfuryl bromide is substituted for the sulfuryl chloride of said example. There is obtained a good yield of a product identified as 2(5-bromo-2-thenylamino)pyridine.

EXAMPLE VII

5-chloro-N-(2-dimethylaminoethyl)-N-phenyl-2-thenylamine

5 - chloro - N - (2 - dimethylaminoethyl) - N - phenyl-2-thenylamine is prepared by reacting in a chloroform solution 52 parts of N-(2-dimethylaminoethyl)-N-phenyl-2-thenylamine with 16 parts of dry hydrogen chloride and then reacting the resulting dihydrochloride with 30 parts of sulfuryl chloride at a reaction temperature of about 35° C. After all the sulfuryl chloride is added and the exothermic reaction subsides, the resulting mixture is heated to and maintained under reflux conditions for about one hour. The resulting solution is cooled and neutralized and made basic with an aqueous caustic solution with stirring. The mixture is then heated to 50° C. for one hour. The resulting mixture is permitted to settle and the aqueous phase is removed and discarded. The remaining chloroform solution is washed with water and distilled to remove the chloroform. The remaining material is the desired free base containing the 5-chloro-2-thienyl group.

EXAMPLE VIII

5-(5-chloro-2-thienyl)-N,N-diethyl-3-(2-pyridyl)pentylamine

To a solution of the dihydrochloride of N,N-diethyl-3-(2-pyridyl) - 5(2-thienyl)pentylamine in chloroform, there is added an amount of sulfuryl chloride which is about 15% in excess of the stoichiometric amount. The reaction temperature is maintained at 30–40° C. by external cooling and by the dropwise addition the sulfuryl chloride is added. After all the sulfuryl chloride is in and the exothermic reaction subsides, the resulting mixture is heated to and maintained under reflux conditions for one hour. The resulting solution is cooled, neutralized and made basic with an aqueous, 50% sodium hydroxide solution with stirring. The resulting mixture is permitted to settle and the aqueous phase is removed and discarded. The remaining chloroform solution is washed with water and distilled to remove the chloroform. The remaining material is the desired free-base containing the 5-chloro-2-thienyl group.

The corresponding compound 5(5-bromo-2-thienyl)N,N-diethyl-3(2-pyridyl)pentylamine is prepared according to the method of the present example by substituting the dihydrobromide of the thenyl amine for the dihydrochloride and by reacting said amine dihydrobromide with an equimolecular proportion of sulfuryl bromide.

EXAMPLE IX

3-[(5-chloro-2-thenyl)(2-dimethylaminoethyl)amino]-2-picoline

The procedure of Example I is repeated except that an equimolecular proportion of 3-[(2-dimethylaminoethyl)(2-thenyl)amino]-2-picoline trihydrochloride is substituted for the trihydrochloride of said example and equal parts of tetrachloroethane are used in place of the chloroform of said example. A good yield of 3-[(5-chloro-2-thenyl)(2-dimethylaminoethyl)amino] - 2 - picoline is obtained.

EXAMPLE X

3-benzyl-4(5-chloro-2-thienyl)-N,N-diethylbutyl amine

The procedure of Example VII is repeated except that an equimolecular proportion of 3-benzyl-N,N-diethyl-4-(2-thienyl)butylamine hydrochloride is substituted for the amine trihydrochloride of said example. A good yield of 3-benzyl-4(5-chloro-2-thienyl)-N,N-diethylbutyl amine is obtained.

EXAMPLE XI

2[(5-chloro-3-methyl-2-thenyl)(2-dimethylaminoethyl)amino]pyridine

The procedure of Example I is repeated except that an equimolecular proportion of 2-[(2-dimethylaminoethyl)-3-methyl-2-thenylamino]pyridine trihydrochloride is substituted for the methapyrilene trihydrochloride. A good yield of the 5-chloro-2-thienyl amine is obtained.

EXAMPLE XII

The procedure of Example I is repeated except 600 parts of tetrachloroethane is substituted for the chloroform of said example. There is obtained an excellent yield of a free base identified as 2-[(5-chloro-2-thenyl)(2-dimethylaminoethyl)amino]pyridine having a refractive index $n_D^{25}$ of 1.5860.

As illustrative of other compounds which may be prepared by the process of this invention, there may be named:

5-chloro-2-thienylamine
5-chloro-2-thenylamine
N-(5-chloro-2-thienyl)ethylamine
N-(5-chloro-2-thienyl)propylamine
N-(5-chloro-2-thienyl)isodecylamine
N-(5-chloro-2-thienyl)isobutylamine N-(5-chloro-2-thienyl)cyclobutylamine
N-(5-chloro-2-thienyl)cycloheptylamine
N-(5-chloro-2-thienyl)p-toluidine
N-(5-chloro-2-thienyl)-2-naphthylamine
N-(5-chloro-2-thienyl)dibutylamine
2-(5-chloro-2-thienyl)aminopyridine
4-[(5-chloro-2-thienyl)amino]-2-picoline
5-chloro-N-(2-piperidyl)-2-thenylamine
5-chloro-N-benzyl-2-thenylamine
5-chloro-N-(4-propylphenyl)-2-thenylamine
5-chloro-N-(phenylpropyl)-2-thenylamine
5-chloro-N-(2,4-dimethylphenyl)-2-thenylamine
5-chloro-N-(4-ethylcyclohexyl)-2-thenylamine
7-(5-chloro-2-thienyl)-N,N - diethyl-5-methyl-2-(2-pyridyl)heptylamine
2-[(5-chloro - 2 - thenyl)(3-diethylaminopropyl)amino]piperidine
5-chloro-N-(2-diethylaminoethyl)-N-phenyl-2-thenylamine
2[(5-chloro-3-methylthenyl)(2-dipropylaminoethyl)amino]pyridine
3-[(5-chloro-2-thenyl)(2-ethylaminoethyl)amino]pyridine
2-[(5-bromo-3-methyl - 2 - thenyl)(2-dimethylaminoethyl)amino]pyridine
2-benzyl-4-(5-chloro-2-thienyl)-N,N-diethylbutylamine
2[(5-chloro-3-ethyl-2-thenyl)(2-diethylaminoethyl)amino]pyridine
4-(5-chloro-2-thienyl)-2-(o-tolyl)butylamine
4-(5-chloro-2-thienyl) - N,N - dimethyl-3-(2-pyridyl)butylamine
3-[(5-chloro - 2 - thenyl)(2 - dimethylaminoethyl)aminomethyl]pyridine
2[(5-chloro - 2 - thenyl)(2-ethylmethylaminoethyl)amino]pyridine While specific reactants, quantities of reactants, reaction conditions, solvents, etc. have been set forth in the preceding examples, it will be obvious to those skilled in the art that such factors may be subject to substantial variation.

For example, in the specific examples the temperatures employed were 0° C. to 40° C. However, the preferred temperature range is —10° C. to +60° C. Those skilled in the art will recognize that the process of this invention is not limited to specific reaction temperatures, since the process can be carried out at temperatures of from 0° C. to —30° C. in chloroform. A reaction temperature of —30° C., for example can be maintained by employing a cooling bath comprising a slurry of solid carbon dioxide in acetone. As will be appreciated the rate of reaction at such a temperature will be somewhat lower than that at —10° C. to +10° C. The minimum temperature for the process of this invention is therefore that temperature just above that at which no reaction between the 2-thienyl containing amine and the sulfuryl halide will take place. The maximum temperature is only of economic importance, for it is dependent upon economic factors rather than technical factors. It has been found, in certain cases, that as the reaction temperature increases, the chlorination of the side chain increases; i.e. the organic residue attached to the carbon atom in the 2-position of the thienyl ring, increases and decomposition of the resulting product occurs forming aldehydes and amines. For example, where the amine being halogenated contains a thenyl group, there are formed thiophene aldehydes as well as an amine from the remainder of the molecule of the reactant. However, not all of the 5-halo-2-thienyl amine product undergoes side-chain halogenation. Hence the desired product can be obtained by the process of this invention regardless of the reaction temperature employed and temperatures above 60° C. to 100° C. can be used where lower yields, i.e. yields considerably below 50% of the theoretical, can be tolerated in a commercial process. Lower yields can be somewhat offset by carrying out the process at super atmospheric pressure, e.g. pressures slightly above atmospheric are necessary at high temperatures to prevent the vaporization of the sulfuryl halide reactant.

Also, as hereinbefore stated, the process of this invention is carried out in an inert liquid reaction medium provided by a non-aqueous, inert solvent or dispersing medium for the thienyl amine or acid salt of the thienyl amine. In addition to possessing the property of being a solvent or dispersing medium for the amine or amine acid salt reactant, the liquid reaction medium preferably should be inert to the sulfuryl halide reactant at the reaction temperature employed to avoid excessive consumption of sulfuryl halide. Although reactive liquid organic media may be employed, it will be understood that the use of such compounds will not provide for an efficient reaction medium since these materials might well compete with the amine or its acid salt, thus consuming the sulfuryl halide reactant and forming compounds which have little or no use or which are not at all desired. Thusly, those skilled in the art will immediately recognize the fact that such liquid organic compounds as ketones, alcohols, alkenes, alkynes, amines, carboxylic acids and aldehydes, to name a few, will not be desirable in such a process. Hence the preferred class of liquid reaction media for the process of this invention are those which will not react with the sulfuryl halide reactant. These materials are well known to those skilled in the art and include such liquid hydrocarbons as hexane, octane, nonane, cyclohexane, cycloheptane, etc., and liquid chlorinated hydrocarbons as chloroform, carbon tetrachloride, chlorobenzene, o-dichlorobenzene, tetrachloroethane, etc. The reaction is preferably carried out in solution in an inert chlorinated aliphatic hydrocarbon solvent, the most preferred solvents being chloroform and tetrachloroethane. The proportion of the inert liquid reaction medium may be varied over a wide range, obviously, the minimum amount is that amount which is necessary to provide a fluid reaction medium and thusly, considerable excesses of the medium may be employed.

As hereinabove stated, it is preferred that the 2-thienyl amine be converted to its acid salt before proceeding to react same with the sulfuryl halide, since this avoids undue consumption of the sulfuryl halide reactant. In addition it has also been pointed out that the hydrohalides are the most preferred materials for converting the amines to their acid salt form. Therefore, the preferred method of carrying out this process comprises reacting the 2-thienyl amine with a hydrohalide to convert the amine to the acid salt form and thereafter reacting said amine hydrohalide with the sulfuryl halide. It is necessary that all the amine groups in the molecule be bound up by converting same to the acid salt form before effecting the halogenation of the 2-thienyl group; hence, the term "acid salt of a 2-thienylamine" shall be understood to refer to those compounds in which all the amine groups are converted to the acid salt form.

After the halogenation reaction is complete, the desired 5-halo-2-thienyl amine may be recovered from the reaction mixture by any method well known to those skilled in the art. Preferably, the reaction mixture is degassed and then made distinctly basic (pH above 10) with an aqueous alkaline solution to free the amine. In some cases it may be necessary to heat the basic solution to effect this result. The mixture is permitted to settle and the aqueous phase is removed and discarded. The remaining organic phase is distilled to remove the inert liquid organic medium and the residue is subjected to fractional distillation to recover the desired 5-halo-2-thienyl containing amine.

This application is a continuation-in-part of application Serial Number 608,434, filed September 7, 1956, now abandoned.

While this invention has been described with respect to certain embodiments, it is not so limited and it is to be understood that variations and modifications thereof which are obvious to those skilled in the art may be made without departing from the spirit or scope of this invention.

What is claimed is:
1. In the method of preparing a 5-halo-2-thienyl amine of the formula

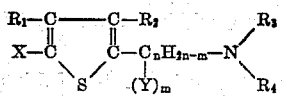

wherein X is a halogen atom; n is an integer of from 0 to 6, m is an integer of 0 to 1; $R_1$ and $R_2$ are selected from the group consisting of hydrogen, and lower alkyl; $R_3$ is selected from the group consisting of hydrogen, an alkyl radical having up to 18 carbon atoms, a cycloalkyl radical having from 4 to 10 carbon atoms, a six-membered heterocyclic nitrogen-containing radical having a single nitrogen atom which is the only hetero atom in the ring; and $R_4$ is selected from the group consisting of $R_3$ and a radical of the structure

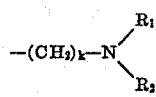

wherein k is an integer of from 1 to 6 and Y is a radical selected from the group consisting of aryl hydrocarbon radicals having from 6 to 12 carbon atoms and a six-membered heterocyclic nitrogen containing radical having a single nitrogen atom which is the only hetero atom in the ring, the step which comprises reacting, in an inert liquid reaction medium, a sulfuryl halide with the acid salt of a 2-thienyl amine of the formula:

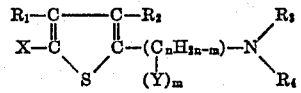

wherein $R_1$, $R_2$, $R_3$, $R_4$ m, n and Y have the same meaning as above.

2. The method of claim 1 wherein the acid salt is the hydrohalide of the 2-thienyl amine reactant.
3. The method of claim 1 wherein the acid salt is the hydrochloride of the 2-thienyl amine and the sulfuryl halide is sulfuryl chloride.
4. The method of claim 3 wherein the reaction temperature employed is within the range of from $-10°$ C. to $+60°$ C.
5. The method of claim 4 wherein the inert liquid reaction medium is selected from the group consisting of chloroform and tetrachloroethane.
6. In the method of preparing 5-chloro-2-thienyl amine of the formula:

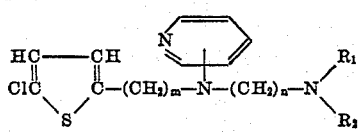

wherein m is an integer of from 0 to 1, n is an integer of from 1 to 6, $R_1$ and $R_2$ are lower alkyl radicals, the step which comprises reacting, at a temperature of from $-10°$ C. to $+60°$ C., sulfuryl chloride with substantially equimolecular proportions of the trihydrochloride of an amine of the formula:

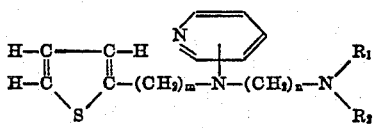

wherein m, n, $R_1$ and $R_2$ have the same meaning as above, which trihydrochloride is dissolved in an inert liquid chlorinated aliphatic hydrocarbon solvent.
7. The method of claim 6 wherein the liquid chlorinated aliphatic hydrocarbon is chloroform.
8. The method of claim 6 wherein the liquid chlorinated aliphatic hydrocarbon is tetrachloroethane.

9. In the method of preparing 2-[(5-chloro-2-thenyl)-(2-dimethylaminoethyl)amino]pyridine, the steps which comprises reacting at a temperature of from $-10°$ C. to $+60°$ C., sulfuryl chloride with substantially equimolecular proportions of methapyrilene trihydrochloride, which trihydrochloride is dissolved in chloroform.
10. In the method of preparing 2-[(5-chloro-2-thenyl)-(2-dimethylaminoethyl)amino]pyridine, the step which comprises reacting at a temperature of from $-10°$ C. to $+60°$ C., sulfuryl chloride with substantially equimolecular proportions of methapyrilene trihydrochloride, which trihydrochloride is dissolved in tetrachloroethane.
11. In the method of preparing a 5-halo-2-thienyl amine of the formula

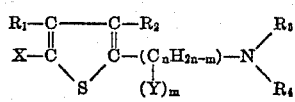

wherein X is a halogen atom, n is an integer of from 0 to 6, m is an integer of 0 to 1, $R_1$ and $R_2$ are selected from the group consisting of hydrogen and lower alkyl; $R_3$ is selected from the group consisting of hydrogen, an alkyl radical having up to 18 carbon atoms, an aryl radical having from 6 to 12 carbon atoms, a cycloalkyl radical having from 4 to 10 carbon atoms, a six-membered heterocyclic nitrogen-containing radical having a single nitrogen atom which is the only hetero atom in the ring, and $R_4$ is selected from the group consisting of $R_3$ and a radical of the structure

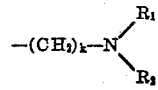

wherein k is an integer of from 1 to 6 and Y is a radical selected from the group consisting of aryl hydrocarbon radicals having from 6 to 12 carbon atoms and a six-membered heterocyclic nitrogen containing radical having a single nitrogen atom which is the only hetero atom in the ring, the steps which comprise reacting, in an inert liquid reaction medium, a hydrohalide with an amine of the formula

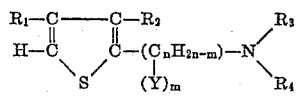

wherein $R_1$, $R_2$, $R_3$, $R_4$, m, n and Y have the same meaning as above, and thereafter reacting the amine hydrohalide with a sulfuryl halide.
12. The method of claim 11 wherein the hydrohalide is HCl and the sulfuryl halide is sulfuryl chloride.
13. The method of claim 12 wherein the reaction temperature employed in both steps is within the range of from $-10°$ C. to $+60°$ C.
14. The method of claim 13 wherein the inert reaction medium is selected from the group consisting of chloroform and tetrachloroethane.
15. In the method of preparing a 5-chloro-2-thienyl amine of the formula

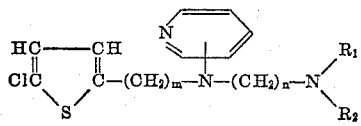

wherein m is an integer of from 0 to 1, n is an integer of from 1 to 6, $R_1$ and $R_2$ are lower alkyl radicals, the steps which comprise reacting gaseous HCl with an amine of the formula

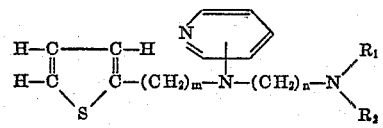

wherein m, n, $R_1$ and $R_2$ have the same meaning as above, and thereafter reacting the amine hydrochloride with sulfuryl chloride, both steps being carried out in an inert liquid chlorinated aliphatic hydrocarbon solvent and at a reaction temperature within the range of from −10° C. to +60° C.

16. The method of claim 15 wherein the liquid chlorinated aliphatic hydrocarbon is chloroform.

17. The method of claim 15 wherein the liquid chlorinated aliphatic hydrocarbon is tetrachloroethane.

18. In the method of preparing 2-[(5-chloro-2-thenyl)-(2-dimethylaminoethyl)amino]pyridine, the steps which comprise reacting gaseous HCl with methapyrilene and thereafter reacting the methapyrilene trihydrochloride with substantially equimolecular proportions of sulfuryl chloride, both steps being carried out in chloroform and at a temperature within the range of from −10° C. to +60° C.

19. In the method of preparing 2-[(5-chloro-2-thenyl)-(2-dimethylaminoethyl)amino]pyridine, the steps which comprise reacting gaseous HCl with methapyrilene and thereafter reacting the methapyrilene trihydrochloride with substantially equimolecular proportions of sulfuryl chloride, both steps being carried out in tetrachloroethane and at a temperature within the range of from −10° C. to +60° C.

References Cited in the file of this patent

UNITED STATES PATENTS

| | | |
|---|---|---|
| 2,540,675 | Johnson et al. | Feb. 6, 1951 |
| 2,543,544 | Campaigne et al. | Feb. 27, 1951 |
| 2,585,091 | Clarke | Feb. 12, 1952 |
| 2,656,358 | Sperber et al. | Oct. 20, 1953 |
| 2,697,713 | Arnold | Dec. 21, 1954 |